United States Patent
Park et al.

(10) Patent No.: US 11,797,124 B2
(45) Date of Patent: Oct. 24, 2023

(54) TOUCH DRIVING CIRCUIT, TOUCH DISPLAY DEVICE, AND TOUCH DRIVING METHOD THEREOF

(71) Applicant: LG DISPLAY CO., LTD., Seoul (KR)

(72) Inventors: SeungChul Park, Chilgok-gun (KR); KiJeong Lee, Gyeonggi-do (KR); MinKi Kim, Daegu (KR); ChangHwan Seo, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/357,407

(22) Filed: Jun. 24, 2021

(65) Prior Publication Data

US 2022/0187941 A1 Jun. 16, 2022

(30) Foreign Application Priority Data

Dec. 10, 2020 (KR) .......................... 10-2020-0172655

(51) Int. Cl.
*G06F 3/044* (2006.01)
*G06F 3/041* (2006.01)
*G06F 1/3234* (2019.01)
*G06F 3/0354* (2013.01)

(52) U.S. Cl.
CPC ........ *G06F 3/04166* (2019.05); *G06F 3/0416* (2013.01); *G06F 3/04162* (2019.05); *G06F 3/041661* (2019.05); *G06F 3/03545* (2013.01); *G06F 3/0412* (2013.01); *G06F 3/0441* (2019.05); *G06F 2203/04108* (2013.01); *G09G 2310/08* (2013.01)

(58) Field of Classification Search
CPC .. G06F 1/3262; G06F 3/03545; G06F 3/0383; G06F 3/0412; G06F 3/0416; G06F 3/04162; G06F 3/04166; G06F 3/041661; G06F 3/04184; G06F 3/0441; G06F 3/0443; G06F 13/4265; G06F 2203/04108; G09G 2310/08; Y02D 10/00
See application file for complete search history.

(56) References Cited

U.S. PATENT DOCUMENTS

2015/0253927 A1* 9/2015 Noto ..................... G06F 3/0446
345/174

FOREIGN PATENT DOCUMENTS

| DE | 102014103677 A | * | 4/2015 | |
| EP | 3731072 A1 | * | 10/2020 | ........... G06F 1/3215 |
| WO | WO-2017059738 A1 | * | 4/2017 | ........... G06F 1/3262 |

* cited by examiner

*Primary Examiner* — Julie Anne Watko
(74) *Attorney, Agent, or Firm* — Birch, Stewart, Kolasch & Birch, LLP

(57) ABSTRACT

A touch driving circuit, a touch display device, and a touch driving method are discussed, which are capable of reducing power consumption by dividing into an active mode and an idle mode according to a touch sensing type, shortening the touch driving period in the idle mode and reducing some operations related to the image displaying function.

11 Claims, 12 Drawing Sheets

TOUCH DRIVING CIRCUIT, TOUCH DISPLAY DEVICE, AND TOUCH DRIVING METHOD THEREOF

CROSS-REFERENCE TO RELATED APPLICATION

This application claims the priority benefit of Korean Patent Application No. 10-2020-0172655, filed on Dec. 10, 2020 in the Korean Intellectual Property Office, the entire contents of which are expressly incorporated herein by reference in its entirety into the present application.

BACKGROUND

1. Technical Field

Embodiments according to the present disclosure relate to a touch driving circuit, a touch display device, and a touch driving method.

2. Discussion of the Related Art

As the information-oriented society has been developed, various needs for display devices for displaying an image have increased. Recently, various types of display devices, such as a Liquid Crystal Display device, a Plasma Display Panel device, and an Organic Light Emitting display device, have been utilized.

Meanwhile, in providing a touch input function in display devices, for providing thin portable devices, such as a smart phone, a tablet PC, or the like, an in-cell type touch display device in which components for a touch screen are integrated inside of the display panel of the touch display device has been developed and utilized.

For a touch input for the touch display device, not only a passive stylus such as a finger, but an active stylus capable of transmitting signals to, and/or receiving signals from, the display panel can be used.

Such a touch display device can perform not only an image displaying function but also a touch sensing function. In particular, for an active stylus, a separate synchronization process can be needed for touch sensing.

As described above, since the touch display device simultaneously performs the image displaying function and the touch sensing function, and does the separate synchronization process for the active stylus to increases power consumption, it is necessary to reduce the power consumption thereof.

SUMMARY OF THE INVENTION

In accordance with embodiments of the present disclosure, a touch driving circuit, a touch display device, and a touch driving method are provided for dividing into an active mode and an idle mode according to a touch sensing type, and reducing power consumption in the idle mode.

In accordance with embodiments of the present disclosure, a touch driving circuit, a touch display device, and a touch driving method are provided for reducing power consumption by shortening the touch driving period in the idle mode.

In accordance with embodiments of the present disclosure, a touch driving circuit, a touch display device, and a touch driving method are provided for reducing power consumption by shortening the touch driving period in the idle mode and reducing some operations related to the image displaying function at the same time.

In accordance with one aspect of the present disclosure, a touch display device is provided that includes a display panel comprising a plurality of touch electrodes, a touch driving circuit that is divided into a first mode and a second mode according to a touch sensing type, and detects a touch presence or a touch position based on a touch sensing signal received from the plurality of touch electrodes, and a timing controller generating a touch synchronization signal so that a touch driving period in the second mode is shorter than a touch driving period in the first mode and supplying it to the touch driving circuit.

In accordance with one aspect of the present disclosure, the first mode is a mode for detecting the touch position, and the second mode is a mode for detecting the touch presence.

In accordance with one aspect of the present disclosure, in the second mode, the same touch driving signal is simultaneously supplied to the plurality of touch electrodes.

In accordance with one aspect of the present disclosure, in the second mode, at least some of the touch sensing functions performed in the first mode are limited.

In accordance with one aspect of the present disclosure, in the case of a long horizontal blank (LHB) driving operation in which two or more touch driving periods are included in one display frame period, the first mode includes two or more touch driving periods in one display frame period, and the second mode includes the touch driving period less than the first mode within one display frame period.

In accordance with one aspect of the present disclosure, the second mode includes one touch driving period within one display frame period.

In accordance with one aspect of the present disclosure, the touch driving period has the same time interval in the first mode and the second mode.

In accordance with one aspect of the present disclosure, the timing controller turns off a memory for temporarily storing digital image data supplied to the display panel in the second mode.

In accordance with one aspect of the present disclosure, the timing controller transmits a data packet to the touch driving circuit through a point-to-point interface, and transmits the data packet through paired signal lines in the first mode, and transmits the data packet through one signal line of the paired signal lines in the second mode.

In accordance with one aspect of the present disclosure, the timing controller, in the second mode, turns off at least a part of power control signals transmitted to the touch driving circuit in the first mode.

In accordance with one aspect of the present disclosure, in the second mode, an uplink signal is transmitted from the display panel to a stylus during a first touch driving period, and a downlink signal is received from the stylus during a second touch driving period.

In accordance with one aspect of the present disclosure, the uplink signal includes a beacon signal needed to drive the stylus and a ping signal for synchronization.

In accordance with one aspect of the present disclosure, the downlink signal is a signal including at least one of the position, a slope, and additional information of the stylus.

In accordance with one aspect of the present disclosure, a touch driving circuit is provided that includes a touch sensing circuit supplying a touch driving signal to a display panel including a plurality of touch electrodes and receiving a touch sensing signal received from the plurality of touch electrodes, and a touch controller generating a mode control signal according to the touch sensing signal, receiving a touch synchronization signal divided into a first mode and a second mode according to the mode control signal, and detecting a touch presence or a touch position according to the touch synchronization signal. The touch synchronization signal can be set so that a touch driving period in the second mode is shorter than a touch driving period in the first mode.

In accordance with further another aspect of the present disclosure, a touch driving method is provided that includes receiving a touch sensing signal from a plurality of touch electrodes disposed on a display panel, generating a mode control signal according to the touch sensing signal, generating a touch synchronization signal divided into a first mode and a second mode according to the mode control signal wherein the touch synchronization signal is configured so that a touch driving period in the second mode is shorter than a touch driving period in the first mode, and supplying a touch driving signal to the display panel during a touch driving period determined by the touch synchronization signal.

In accordance with embodiments of the present disclosure, it is possible to provide a touch driving circuit, a touch display device, and a touch driving method for dividing into an active mode and an idle mode according to a touch sensing type, and reducing power consumption in the idle mode.

In accordance with embodiments of the present disclosure, it is possible to provide a touch driving circuit, a touch display device, and a touch driving method for reducing power consumption by shortening the touch driving period in the idle mode.

In accordance with embodiments of the present disclosure, it is possible to provide a touch driving circuit, a touch display device, and a touch driving method for reducing power consumption by shortening the touch driving period in the idle mode and reducing some operations related to the image displaying function at the same time.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION OF THE EMBODIMENTS

Figure 1:
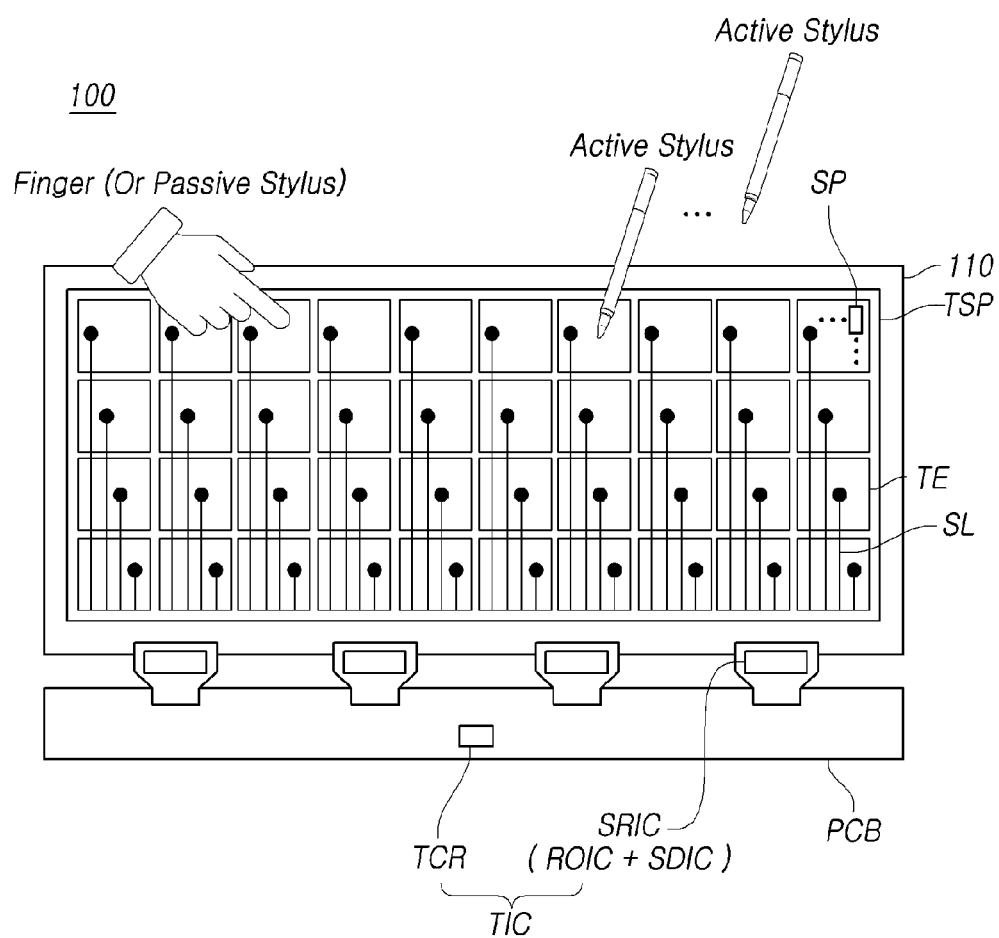
FIG. 1 illustrates a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 illustrates a block diagram of a touch display device 100 according to embodiments of the present disclosure. All components of the touch display device according to all embodiments of the present disclosure are operatively coupled and configured.

Referring to FIG. 1, the touch display device 100 according to the embodiments of the present disclosure can be, for example, a display device capable of providing a touch sensing function of a passive stylus such as a finger, a conductive object, or the like, and a touch sensing function of an active stylus such as a pen, in addition to an image displaying function. The touch display device 100 can include at least one sub-pixel SP.

The touch display device 100 according to the embodiments of the present disclosure can be a display device in which a touch screen panel TSP including a plurality of touch electrodes TE as touch sensors is embedded into a display panel 110. For example, the touch display device 100 can be a television TV, a monitor, or the like, or a mobile device such as a tablet, a smart phone, or the like.

For example, the touch display device 100 can divide a common electrode used in a display period into a plurality of groups and then use the plurality of divided groups as a plurality of touch electrodes TE. In another example, the touch display device 100 can use a plurality of touch electrodes TE as touch sensing electrodes or touch driving electrodes.

The display panel 110 can be a liquid crystal display (LCD) panel, an organic light emitting diode panel, or the like.

For example, when the display panel 110 is the liquid crystal display panel, the touch display device 100 can divide a common electrode, to which a common voltage is applied, which forms electric fields with pixel electrodes into a plurality of groups and then use the plurality of divided groups as respective touch electrodes TE.

In another example, when the display panel 110 is the organic light emitting diode panel, the touch display device 100 can include an organic light emitting diode composed of a first electrode, an organic light emitting layer, and a second electrode, an encapsulation layer located on the second electrode and having a encapsulating function, and a touch sensor metal layer located on the encapsulation layer. Here, a plurality of touch electrodes can be formed on the touch sensor metal layer.

Hereinafter, for convenience of description and ease of understanding, it is assumed that a plurality of touch electrodes TE are used as touch driving electrodes (touch sensing electrodes) in the process of touch driving, and are used as a common electrode in the process of display driving.

The touch display device 100 can include a touch driving circuit TIC performing a finger sensing operation and a stylus sensing operation using signals received through the display panel 110 by driving the display panel 110 in which the touch screen panel TSP is integrated.

The touch driving circuit TIC can include a first circuit for receiving signals through the display panel 110 by driving the display panel 110, and a second circuit performing a finger touch sensing operation and a stylus touch sensing operation using the signals received through the display panel 110. The first circuit can be referred to as a touch sensing circuit ROIC, and the second circuit can be referred to as a touch controller TCR.

The touch sensing circuit ROIC can be implemented as an integrated driving circuit SRIC together with a data driving circuit SDIC driving data lines.

The integrated driving circuit SRIC can be implemented in a type of Chip On Film (COF) in which the integrated driving circuit SRIC is mounted on a film.

The film on which the integrated driving circuit SRIC is mounted can be attached to a bonding portion of the display panel 110 and a bonding portion of a printed circuit board PCB.

The touch controller TCR etc. can be mounted on the printed circuit board PCB.

The touch sensing circuit ROIC and the data driving circuit SDIC can be implemented as separate driving chips. The touch sensing circuit ROIC can be electrically connected to the plurality of touch electrodes TE included in the display panel 110 through a plurality of signal lines SL.

At this time, the touch sensing circuit ROIC can perform touch sensing during a touch period from a display period separately divided in time. In another example, the touch sensing circuit ROIC can perform touch sensing process and display driving process simultaneously, and in this case, the touch period can have a time period equal to the display period.

In addition, the touch display device 100 can include a controller such as a timing controller that controls the touch driving circuit TIC.

The timing controller can generate a touch synchronization signal that controls the touch driving circuit TIC. The timing controller exchanges touch driving signals and the like based on an interface defined between the touch driving circuit TIC.

Here, the touch driving circuit TIC can be implemented in the form of one integrated circuit together with the touch controller, or in the form of one integrated circuit together with the timing controller 140.

The timing controller receives timing signals such as a vertical synchronization signal, a horizontal synchronization signal, a data enable signal, and a main clock and digital image data from a host system.

The timing controller controls the scan timing of the gate driving circuit based on scan timing control signals such as a gate start pulse, a gate shift clock, and a gate output enable signal. Further, the timing controller controls the data timing of the data driving circuit SDIC based on a data timing control signal such as a source sampling clock and a source output enable signal.

Figure 2:
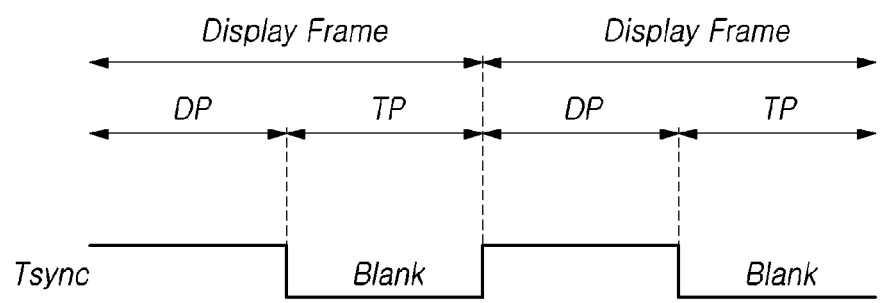
FIG. 2 illustrates timings for configuring a display driving period and a touch driving period in the touch display device according to embodiments of the present disclosure.

FIG. 2 illustrates timings for configuring a display driving period and a touch driving period in the touch display device according to embodiments of the present disclosure.

Referring to FIG. 2, the touch display device 100 according to the embodiments of the present disclosure performs display driving for displaying images during the predefined display driving period DP, and performs touch driving for sensing a touch input from a finger or a stylus during the predefined touch driving period TP within a display frame period.

The touch display device 100 uses a common electrode for driving each pixel as an electrode for sensing a touch. Accordingly, during the display driving period DP, a common voltage is provided to the organic light emitting diode, and during the touch driving period TP, a touch driving signal is provided to the common electrode acting as a touch electrode.

The display driving period DP and the touch driving period TP can be equal in time, all or partly overlap with each other in time, or be separated from each other in time.

A driving method in which the display driving period DP and the touch driving period TP be separated from each other in time can be referred to as time division driving.

When the display driving period DP and the touch driving period TP are equal in time, the display driving operation and the touch driving operation can be performed simultaneously. This driving method is can be referred to as time free driving operation.

In the time division driving, the display driving period DP and the touch driving period TP can be alternately arranged.

Thus, when the display driving period DP and the touch driving period TP are separated in time while alternately being arranged, the touch driving period TP can correspond to a blank period Blank in which the display driving operation is not performed.

The touch display device 100 can generate a touch synchronization signal Tsync swing between a high level and a low level, and through this, can identify or control the display driving period DP and the touch driving period TP. For example, the touch synchronization signal Tsync can be a driving timing control signal for defining the touch driving period TP.

For example, a high level period (or a low level period) of the touch synchronization signal Tsync can be corresponded to the display driving period DP, and the low level period (or the high level period) of the touch synchronization signal Tsync can be corresponded to the touch driving period TP.

In this case, the touch sensing circuit ROIC applies the touch driving signal to the touch electrode TE in the touch driving period TP where the touch synchronization is at the low level.

Meanwhile, with respect to methods of assigning the display driving period DP and the touch driving period TP in one display frame period, for example, one display frame period can be divided into one display driving period DP and one touch driving period TP, and display driving operation can be performed during one display driving period DP, and touch driving operation for sensing a touch input from a finger and a stylus can be performed during one touch driving period TP corresponding to a blank period Blank.

The touch display 100 performs the touch driving operation once during a screen refresh rate or a display frame period corresponding to one period of a frame frequency.

For example, when the frame frequency is 60 Hz, display driving operation is performed to turn on or turn off pixels through N gate lines constituting the display panel 110 within a horizontal period of 1/60s. After that, a touch driving period TP for touch sensing operation is performed for a predetermined interval. In this case, the touch report rate will be 60 Hz.

In another example, one display frame period can be divided into two or more display driving periods DP and two or more touch driving periods TP, and display driving operation can be performed during two or more display driving periods DP in one display frame period, and touch driving operation for sensing once or two or more times a touch input from a finger and a stylus on all or at least a part of a display screen can be performed during two or more touch driving periods TP in one display frame period.

Like this, when dividing one display frame period into two or more display driving periods DP and two or more touch driving periods TP, and then performing the display driving operation and the touch driving operation, each of two or more blank periods corresponding to two or more touch driving periods TP in one display frame period is sometimes referred to as a long horizontal blank (LHB).

Accordingly, two or more periods in which the sensing of a touch from a stylus or a finger is performed in a display frame period can be referred to as LHBs or touch driving periods, and touch driving operation performed during two or more LHBs in one touch frame period (which will be described below by referring to FIG. 4) is referred to herein as "LHB driving operation".

The touch display device 100 according to embodiments divides a mode into an active mode and an idle mode according to a touch sensing type, and distinguishes the touch driving period according to a touch sensing mode, thereby reducing power consumption.

Figure 3:
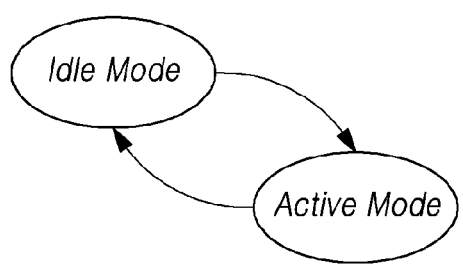
FIG. 3 illustrates a concept in which an active mode and an idle mode are switched according to a touch sensing type in a touch display device according to embodiments of the present disclosure.

FIG. 3 illustrates a concept in which an active mode and an idle mode are switched according to a touch sensing type in a touch display device according to embodiments of the present disclosure.

Referring to FIG. 3, the touch display device 100 according to the embodiments of the present disclosure divides a mode into an idle mode for detecting whether an object (stylus or finger) is touched on the display panel 110 and an active mode that detects a location of the object and sense information transmitted by the stylus.

In this case, the operation modes according to the touch sensing type can be referred to various terms other than the active mode and the idle mode. In addition, a mode for detecting a touch presence is referred to the idle mode and a mode for detecting a touch position referred to the active mode. However, when the touch display device 100 provides a plurality of touch sensing functions, a case where the entire touch sensing function (e.g., the touch presence, a touch position, a touch pressure, etc.) is performed can be referred to the active mode, and a case of reducing power consumption by performing only some touch sensing functions among entire touch sensing functions can be referred to the idle mode.

For example, in the active mode, by applying different touch driving signals to the plurality of touch electrodes TE included in the display panel 110 or by varying the time when the touch driving signals are applied, the touch position can be detected using the touch sensing signal transmitted from the electrode TE. In addition, in the idle mode, the touch presence can be detected by applying the same touch driving signal to the plurality of touch electrodes TE or simultaneously applying the touch driving signal.

In short, the active mode and the idle mode can be viewed as a first mode and a second mode in which sensing is performed in different touch types, respectively.

When the touch of the object is sensed in the idle mode, the touch display device 100 can change to the active mode after a predetermined period of time to sense the touch position. In the idle mode, the touch display device 100 can periodically or non-periodically detects whether a touch of the object input occurs as a result of the object adjacent to the display panel 110. If the touch of the object is detected, the touch display device 100 can intensively sense the touch electrode TE corresponding to the area where the touch of the object is sensed among the display area of the display panel 110, and start the active mode which can sense not only the touch position of the object but also information transmitted by the stylus in the case of the active stylus.

In addition, when the position of the object is not sensed for a predetermined time during the active mode or the output signal of the stylus is not sensed, the touch display device 100 can be changed and driven again to the idle mode. In this case, when the object is detected during the idle mode, the touch display device 100 can change to the active mode again.

In addition, if the output signal of the stylus is continuously detected during the active mode, the touch display device 100 can be driven while maintaining the active mode even when a touch signal by a finger is not detected.

In addition, in the touch display device 100, the time or the number of times of sensing a touch of the object in the active mode can be greater than the time or the number of times of sensing the touch of the object in the idle mode. In other words, in the active mode, more time can be needed to sense the touch position of an object or to detect the output signal of the stylus, so the touch sensing time is further allocated, and in the idle mode, the touch sensing time to detect the touch presence of the object can is allocated relatively few.

As described above, the touch display device 100 divides a mode into the active mode and the idle mode according to a touch sensing type, and sets the touch driving period of the idle mode smaller than the touch driving period of the active mode, thereby reducing power consumption.

Hereinafter, a case where the touch position of the object is detected in the active mode and the touch presence of the object is detected in the idle mode will be described as an example.

Figure 4:
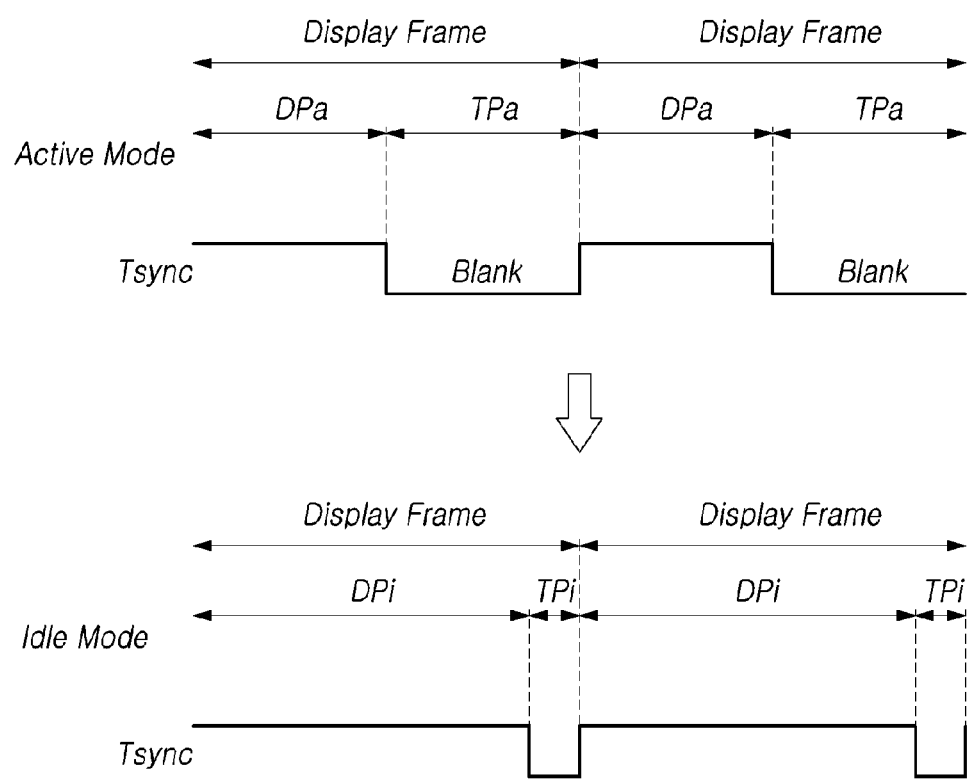
FIG. 4 illustrates a case in which a touch driving period of an active mode and an idle mode is determined differently in a touch display device according to embodiments of the present disclosure.

FIG. 4 illustrates a case in which a touch driving period of an active mode and an idle mode is determined differently in a touch display device according to embodiments of the present disclosure.

Referring to FIG. 4, the touch display device 100 according to the embodiments of the present disclosure performs a display driving operation for displaying image during a predetermined display driving period DPa and Dpi, and a touch driving operation for sensing a touch input by an object (finger or stylus) during a predetermined touch driving period TPa and TPi, within one display frame period.

When the display driving periods DPa and DPi and the touch driving periods TPa and TPi are alternated and separated from each other in time, the touch driving periods TPa and TPi can correspond to blank periods in which display driving operation is not performed.

At this time, the touch display device 100 supplies a touch synchronization signal Tsync, which swings to a high level and a low level by the timing controller, to the touch driving circuit TIC, thereby controlling the display driving period DPa, DPi and the touch driving periods TPa and TPi.

For example, the high level period of the touch synchronization signal Tsync can correspond to the display driving periods DPa and DPi, and the low level period of the touch synchronization signal Tsync can correspond to the touch driving period TPa and TPi.

Accordingly, the touch driving circuit TIC applies the touch driving signal to the touch electrode TE, and senses the touch presence of the object or the touch position using a touch sensing signal received from the touch electrode TE during the touch driving periods TPa and TPi in which the touch synchronization signal Tsync is at a low level.

At this time, the touch display device 100 can differently control the touch driving period TPa in the active mode for detecting the touch position and the touch driving period TPi in the idle mode for detecting the touch presence.

For example, in the touch display device 100, the touch driving period TPi in the idle mode can be determined to be shorter than the touch driving period TPa in the active mode. In this case, if one display frame period is the same, the display driving period DPa in the active mode can be larger than the display driving period DPi in the idle mode.

Accordingly, since the power consumption due to display driving can increase in the idle mode but the power consumption due to the touch driving decreases, the total power consumption of the touch display device 100 can be reduced.

As described above, the driving method in which the touch driving periods TPa and TPi are different from each other in the active mode and the idle mode can be applied to the LHB driving operation in which two or more touch driving periods are performed within one display frame.

Figure 5:
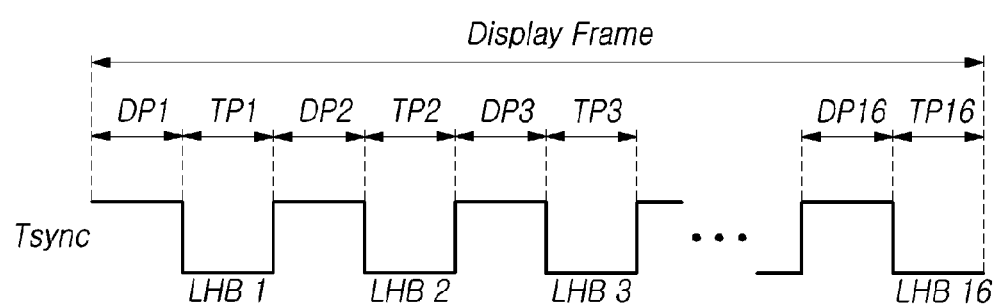
FIG. 5 illustrates a timing single of a long horizontal blank (LHB) driving operation in a touch display device according to embodiments of the present disclosure.

FIG. 5 illustrates a timing signal of a LHB driving operation in a touch display device according to embodiments of the present disclosure.

Referring to FIG. 5, in the touch display device 100 according to the embodiments of the present disclosure, one display frame period can be time divided into 16 display driving periods DP1 to DP16 and 16 touch driving periods TP1 to TP16.

In this case, the 16 touch driving periods TP1 to TP16 can correspond to 16 long horizontal blanks (LHBs) LHB1 to LHB16.

In this case, the touch display device 100 divides one display frame period into one or more display driving periods DP1 to DP16 and one or more touch driving periods TP1 to TP16, and performs alternately the display driving operation and the touch driving operation.

Alternatively, the touch driving periods TP1 to TP16 can proceed independently from the display driving periods DP1 to DP16.

Figure 6:
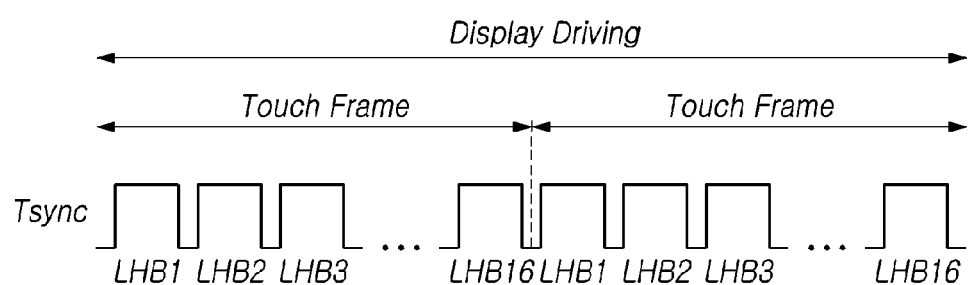
FIG. 6 illustrates a display driving timing and an independent touch driving timing in a touch display device according to embodiments of the present disclosure.

FIG. 6 illustrates a display driving timing and an independent touch driving timing in a touch display device according to embodiments of the present disclosure.

Referring to FIG. 6, in the touch display device 100 according to the embodiments of the present disclosure, the display driving operation and the touch driving operation can be performed at different times, but the display driving operation and the touch driving operation can be performed simultaneously.

Accordingly, the touch synchronization signal Tsync can serve to distinguish between the display driving period DP and the touch driving period TP, and can distinguish and indicate only the touch driving period TP.

For example, the 16 LHBs LHB1 to LHB16 can be one touch frame period. Here, the touch frame period can mean a period in which a touch by an object (finger or stylus) can be sensed once in the entire screen area of the display panel 110.

Here, as an example, the touch synchronization signal Tsync is driven in a high level period, but the touch driving operation can be performed in a low level period in the touch synchronization signal Tsync.

Meanwhile, in the 16 LHBs LHB1 to LHB16, either the touch driving for sensing a touch by a finger or the touch driving operation for sensing a touch by a stylus can be performed.

Even in the case of the LHB driving operation in which two or more touch driving periods are performed within one display frame period, the touch display device 100 can divide a mode into an active mode and an idle mode according to the touch sensing type and determine the touch driving period in the idle mode smaller than the touch driving period in the active mode, thereby reducing the power consumption.

Figure 7:
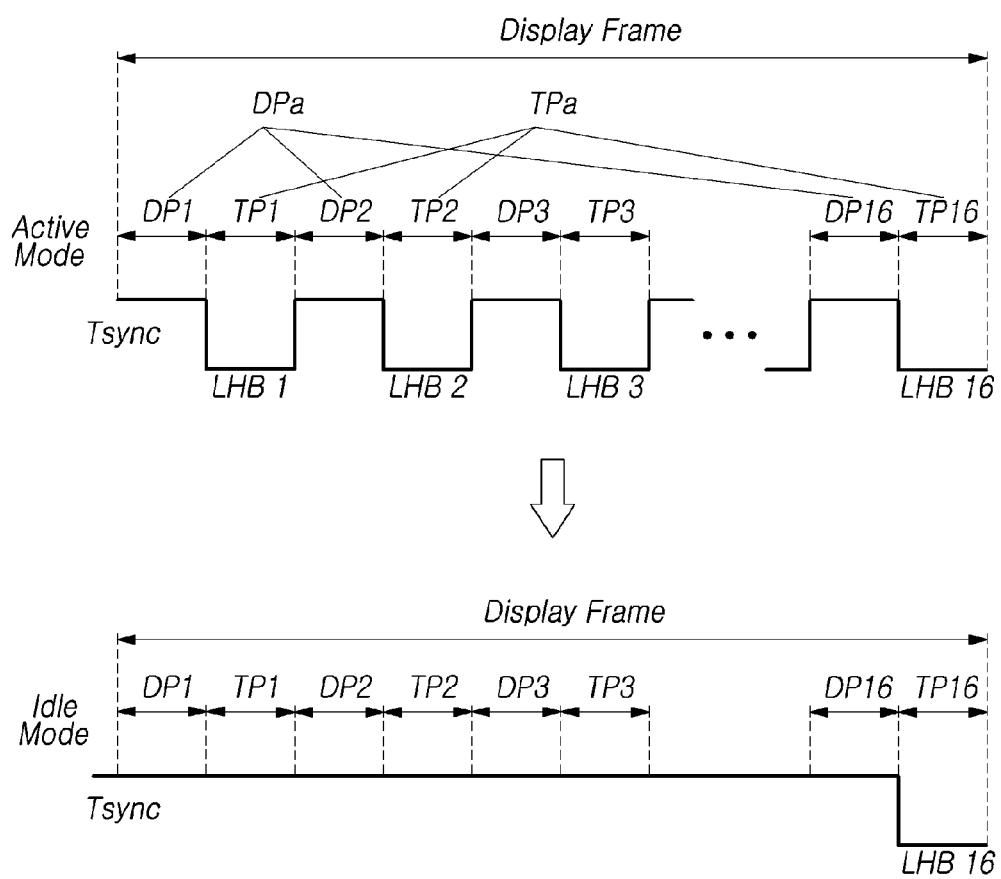
FIG. 7 illustrates a case in which a touch driving period in an active mode and an idle mode is determined differently in the case of LHB driving operation in the touch display device according to embodiments of the present disclosure.

FIG. 7 illustrates a case in which a touch driving period in an active mode and an idle mode is determined differently in the case of LHB driving operation in the touch display device according to embodiments of the present disclosure.

Referring to FIG. 7, the touch display device 100 according to the embodiments of the present disclosure performs a display driving operation for displaying image during a predetermined display driving period DPa and Dpi, and a touch driving operation for sensing a touch input by an object (e.g., finger, stylus, or another input element) during a predetermined touch driving period TPa and TPi, within one display frame period.

When the display driving period DPa and DPi and the touch driving period TPa and TPi are alternated and separated from each other in time, the touch driving period TPa and TPi can correspond to a blank period in which the display driving operation is not performed.

In the case of the LHB driving operation, one display frame period can be time divided into 16 display driving periods DP1 to DP16 and 16 touch driving periods TP1 to TP16. In this case, the 16 touch driving periods TP1 to TP16 can correspond to 16 long horizontal blanks (LHBs) LHB1 to LHB16.

At this time, the touch display device 100 divides one display frame period into one or more display driving periods DP1 to DP16 and one or more touch driving periods TP1 to TP16, and performs alternately the display driving operation and the touch driving operation.

At this time, the touch display device 100 supplies a touch synchronization signal Tsync, which swings to a high level and a low level by the timing controller, to the touch driving circuit TIC, thereby controlling the display driving period DPa, DPi and the touch driving periods TPa and TPi.

For example, the high level period of the touch synchronization signal Tsync can correspond to the display driving periods DPa and DPi, and the low level period of the touch synchronization signal Tsync can correspond to the touch driving period TPa and TPi.

Accordingly, the touch driving circuit TIC applies the touch driving signal to the touch electrode TE, and senses the touch presence of the object or the touch position using a touch sensing signal received from the touch electrode TE during the touch driving periods TPa and TPi in which the touch synchronization signal Tsync is at a low level.

At this time, the touch display device 100 can differently control the touch driving period TPa in the active mode for detecting the touch position and the touch driving period TPi in the idle mode for detecting the touch presence.

For example, the touch display device 100 can include the touch driving period TPa corresponding to the 16 LHBs LHB1 to LHB16 in the active mode (e.g., see FIG. 7), but includes only the touch driving period (e.g., TP16) corresponding to one LHB (e.g., LHB 16) in the idle mode. Of course, the touch driving period in the idle mode can correspond to one LHB, or two or more LHBs. However, the touch driving period in the idle mode can be shorter than the touch driving period TPa in the active mode (e.g., TP16 in the idle mode is shorter than TPa in the active mode).

In this case, if one display frame period is the same, the display driving period DPa in the active mode can be larger than the display driving period in the idle mode.

On the other hand, the touch driving period TPi in the idle mode can be equal to or an integer multiple of the LHB in the active mode, but can be determined at a time interval other than an integer multiple of the LHB.

Accordingly, since the power consumption due to display driving can increase in the idle mode but the power consumption due to the touch driving decreases, the total power consumption due to the touch display device 100 can be reduced.

Meanwhile, the touch display device 100 reduces not only the power consumption used for the touch driving by reducing the touch driving period Tpi in the idle mode, but also power consumption used for the display driving by limiting some operations of the display driving operation needed for displaying image on the display panel 110.

Figure 8:
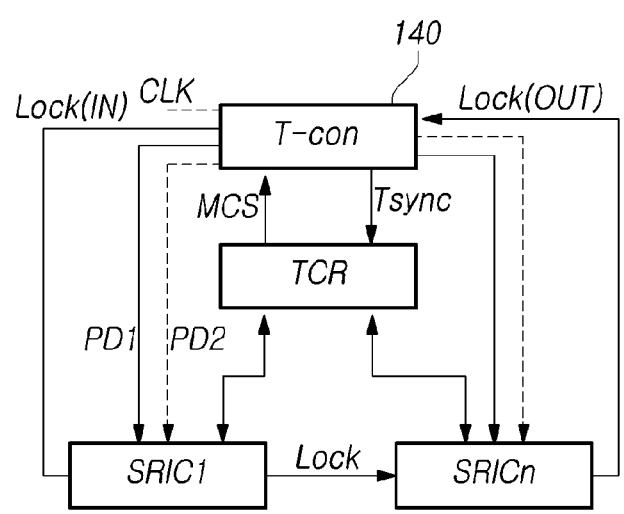
FIG. 8 is a structure illustrating an example of a point-to-point interface in a touch display device according to embodiments of the present disclosure.
Figure 9:
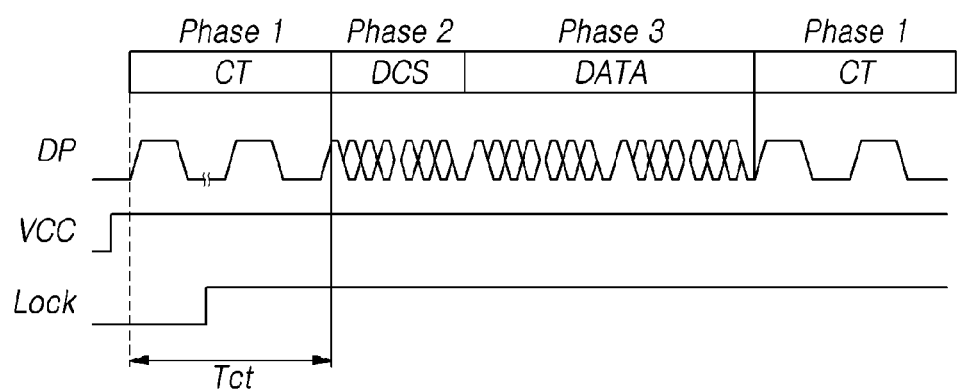
FIG. 9 illustrates an example of a signal waveform transmitted through a point-to-point interface in a display device according to embodiments of the present disclosure.

FIG. 8 is a structure illustrating an example of a point-to-point interface in a touch display device according to embodiments of the present disclosure. FIG. 9 illustrates an example of a signal waveform transmitted through a point-to-point interface in a display device according to embodiments of the present disclosure.

Referring to FIGS. 8 and 9, the touch display device 100 according to the embodiments of the present disclosure includes a timing controller 140 for transmitting a plurality of data packets PD1, PD2, a plurality of integrated driving circuits SRIC1-SRICn for receiving the plurality of data packets PD1, PD2 from the timing controller 140, and a touch controller TCR for performing a touch sensing operation by using a touch sensing signal received through controlling the display panel 110.

The interface standard as an example here is an embedded point-to-point interface (EPI) that serializes data control signals and digital images, inserts clock information and transmits data packets PD1, PD2 in packet units in order to reduce the number of data transmission lines between the timing controller 140 and the integrated driving circuit SRIC1-SRICn and enable high-speed transmission.

As an example, the timing controller 140 transmits the data packets PD1, PD2 through paired signal lines, and the two integrated driving circuits SRIC1, SRIC2 receive the data packets PD1, PD2 which will be supplied to the display panel 110.

The timing controller 140 can transmit the data packets PD1 and PD2 to the corresponding integrated driving circuits SRIC1, SRIC2 according to the clock signal CLK, respectively.

The data packets PD1, PD2 transmitted by the timing controller 140 are transmitted through the paired signal lines during a transmission period. The transmission period can be divided into a first transmission period, a second transmission period, and a third transmission period.

A clock training operation for synchronizing the clock signal CLK is performed using a clock training pattern CT in the first transmission period. A data control signal DCS for controlling the integrated driving circuit SRIC1, SRIC2 can be transmitted in the second transmission period. Digital image data DATA can be transmitted in a third transmission period. However, the interval in which the data packets PD1, PD2 are transmitted and the type of transmitted data can be expressed in various ways.

The timing controller 140 performs the clock training operation with the integrated driving circuits SRIC1, SRIC2 during a clock training time Tct within a horizontal blank period or a vertical blank period to synchronize the clock signal CLK.

The timing controller 140 can transmit a lock input signal Lock(IN) to the first integrated driving circuit SRIC1 in a state synchronized with the integrated driving circuits SRIC1, SRIC2 through the above-mentioned clock training operation. In addition, the timing controller 140 can receive the lock output signal Lock(OUT) from the second integrated driving circuit SRIC2.

When the phase of the internal clock signal is fixed, the first integrated driving circuit SRIC1 generates a lock signal of a high logic level indicating an output stable state and transmits it to the adjacent second integrated driving circuit SRIC2.

The lock signal Lock generated by the second integrated drive circuit SRIC2 becomes the lock output signal Lock (OUT) of the integrated driving circuit, and the lock output signal Lock(OUT) is transmitted to the timing controller 140 through the signal line connected between the timing controller 140 and the last integrated driving circuit SRIC2. A high-level DC power supply voltage VCC is input to the input terminals of the lock signals Lock(IN) of the integrated driving circuits SRIC1, SRIC2.

When the timing controller 140 receives the normal lock output signal Lock(OUT) from the second integrated driving circuit SRIC2, it transmits the data packets PD1, PD2 corresponding to the integrated driving circuits SRIC1, SRIC2, respectively.

The embedded point-to-point interface (EPI) standard may not use a line through which the clock signal CLK is transmitted between the timing controller 140 and the integrated driving circuits SRIC1, SRIC2 in order to reduce the signal line. When the timing controller 140 transmits the data packets PD1, PD2, the integrated driving circuits SRIC1, SRIC2 generate an internal clock signal using the transmitted data packets PD1, PD2, and receive the digital image data DATA in response to the internal clock signal.

At this time, the integrated driving circuits SRIC1, SRIC2 can compare the internal clock signal with the clock training pattern from the timing controller 140, and if there is no abnormality in the comparison result, the high-level lock signal Lock can be generated or the lock output signal Lock(OUT) can be transmitted to the timing controller 140.

The lock output signal Lock(OUT) transmitted from the second integrated driving circuit SRIC2 to the timing controller 140 can be a signal lock input signal Lock(IN) which is transmitted to the first integrated driving circuit SRIC1 from the timing controller 140.

With the lock output signal Lock(OUT) being transmitted to the timing controller 140, the integrated driving circuits SRIC1, SRIC2 can fix the phase and the frequency of the data packets PD1, PD2 synchronized by the clock training to be in a state capable of receiving the data packets PD1, PD2 transmitted from the timing controller 140.

In the case of using the point-to-point interface, the timing controller 140 can control output characteristics of the transmitted data packets PD1, PD2 depending on the connection status or signal transmission characteristics with the integrated driving circuit SRIC1, SRIC2.

Accordingly, the touch display device 100 can make it different the data packets PD1, PD2 transmitted from the timing controller 140 to the integrated driving circuits SRIC1, SRIC2 according to the active mode and the idle mode, thereby reducing the power consumption in the idle mode.

For example, the timing controller 140 simultaneously transmits the data packets PD1, PD2 through the paired signal line in the active mode, but transmits one of the data packets PD1, PD2 through one signal line in the idle mode, thereby reducing power consumption.

At this time, since the touch controller TCR can control the active mode and the idle mode according to the touch sensing type on the display panel 110, the timing controller 140 can control the data packets PD1, PD2 transmitted to the integrated driving circuits SRIC1 and SRIC2 by receiving the mode control signal MCS from the touch controller TCR.

In addition, the touch display device 100 can partially limit the data packets PD1, PD2 transmitted to the integrated driving circuits SRIC1, SRIC2 in the idle mode, as well as turning off a memory storing a digital image data DATA or turning off some power control signals included in the data control signal DCS, thereby reducing power consumption.

For example, the touch display device 100 turns on the memory for storing the digital image data DATA in an active mode, but turns off the memory in an idle mode to provide a digital image to control the digital image data DATA to be directly transferred to the integrated driving circuits SRIC1, SRIC2.

On the other hand, the data control signal DCS transmitted to control the integrated driving circuits SRIC1, SRIC2 in the second transmission period can be one of a polarity control signal, a charge sharing option signal, a polarity period control signal of the digital image data, a power control signal of the integrated driving circuits SRIC1 and SRIC2, a channel selection signal of the integrated driving circuits SRIC1 and SRIC2, and the like.

Accordingly, the touch display device 100 limiting some of the control signals such as a power control signal or a channel selection signal among the data control signals DCS transmitted to the integrated driving circuits SRIC1, SRIC2 in the idle mode, thereby reducing power consumption for the driving display.

Figure 10:
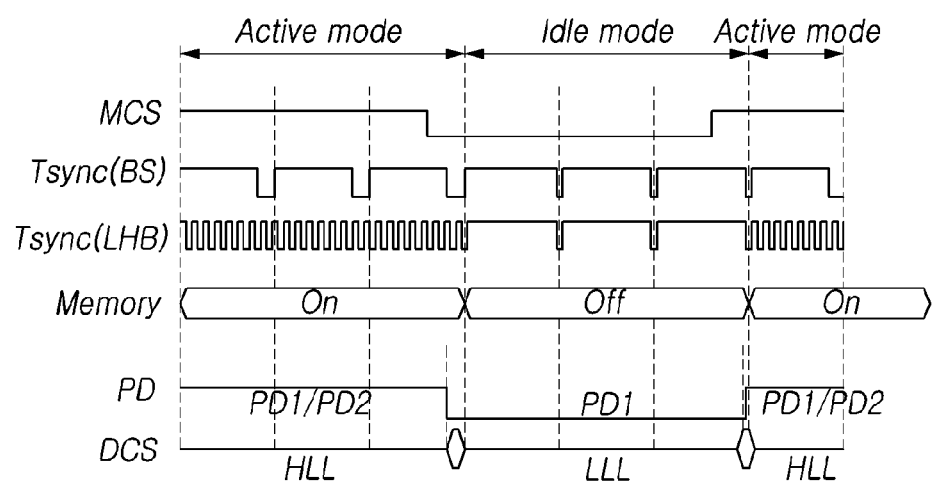
FIG. 10 is an exemplary diagram of signal waveforms for comparing operations in an active mode and an idle mode in a touch display device according to embodiments of the present disclosure.

FIG. 10 is an exemplary diagram of signal waveforms for comparing operations in an active mode and an idle mode in a touch display device according to embodiments of the present disclosure.

Referring to FIG. 10, the touch display device 100 according to the embodiments of the present disclosure can divide a mode into the active mode and the idle mode according to a mode control signal MCS generated by the touch controller TCR.

The idle mode can be an operation mode capable of detecting the touch presence of the object (stylus or finger) on the display panel 110. The active mode can be an operation mode capable of detecting the touch position of the object (stylus or finger) and sensing information transmitted by the stylus.

A case where the entire touch sensing function (e.g., the touch presence, a touch position, a touch pressure, etc.) is performed can be referred to the active mode, and a case of reducing power consumption by performing only some touch sensing functions among entire touch sensing functions can be referred to the idle mode.

The active mode and the idle mode can be determined by a mode control signal MCS generated by the touch controller. For example, when the mode control signal MCS is at a high level, it can be operated in the active mode. When the mode control signal MCS is at a low level, it can be operate in the idle mode.

When the touch sensing operation is performed in the blank period, the timing controller 140 can generate a touch driving signal Tsync(BS) which has a touch driving period of time A in the active mode but that of time B less than the time A in the idle mode during one display frame period.

In this case, since the display frame periods of the active mode and the idle mode are the same, the touch driving period of the idle mode is reduced compared to that of the active mode, but the display driving period of the idle mode can be increased compared to that of the active mode.

In the case of the LHB driving operation including the plurality of touch driving periods in one display frame period, the timing controller 140 can generate a touch driving signal Tsync(BS) which has A number of the touch driving periods in the active mode and B number of the touch driving periods smaller than the A number in the idle mode during one display frame period. In this case, the touch driving period in the idle mode can be the same as or different from the touch driving period in the active mode.

Since the display frame periods of the active mode and the idle mode are the same, the touch driving period of the idle mode within one display frame period is reduced compared to that of the active mode, but the display driving period of the idle mode can be increased compared to that of the active mode.

The timing controller 140 of the touch display device 100 stores the digital image data DATA in the memory for a certain period of time in the active mode and transfers it to the integrated driving circuit SRIC, but turns off the memory and directly transfers the digital image data DATA to the integrated driving circuit SRIC in the mode—thereby reducing power consumption due to driving the memory.

The timing controller 140 of the touch display device 100 transmits the data packet PD to the integrated driving circuit SRIC through the paired signal line in the active mode, but in the idle mode transmits it to the integrated driving circuit SRIC through one of the paired signal lines, thereby reducing power consumption due to transmission of the data packet PD.

In addition, the timing controller 140 of the touch display device 100 blocks some of the power control signals from the data control signals DCS including the data packets PD to a low level in the idle mode, thereby reducing power consumption due to transmission of the data packet PD.

In addition, the touch display device 100 can perform a synchronization process of the active stylus in the idle mode in which the touch driving period is shortened.

Figure 11:
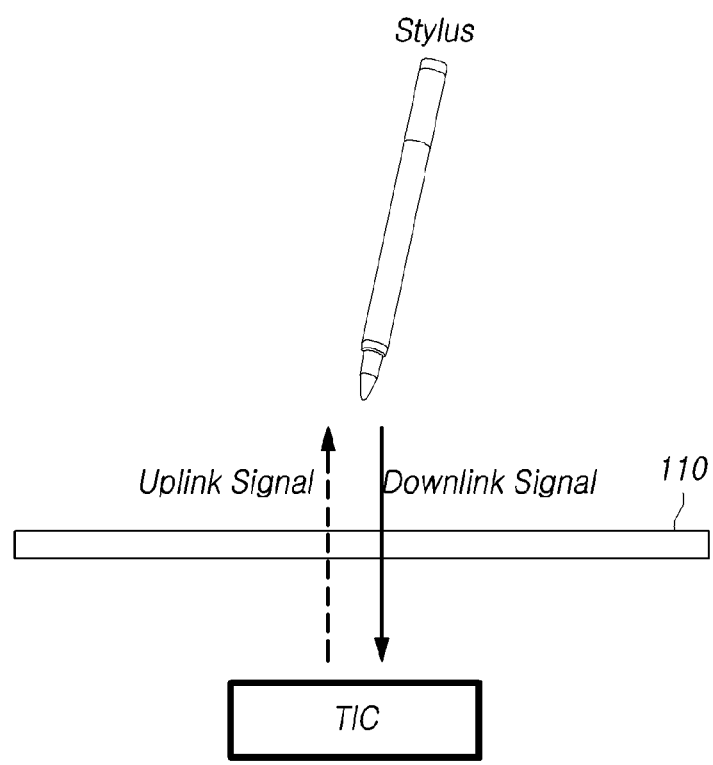
FIG. 11 illustrates an operation between a touch display device and a stylus according to embodiments of the present disclosure.

FIG. 11 illustrates an operation between a touch display device and a stylus according to embodiments of the present disclosure.

Referring to FIG. 11, the touch display apparatus 100 according to the embodiments of the present disclosure transmits an uplink signal including various types of information for controlling driving the stylus and information necessary for driving the stylus during the touch driving period for the touch sensing of the stylus.

More specifically, the touch driving circuit TIC of the touch display device 100 supplies the uplink signal including various information needed for controlling the stylus operation to one or more of the plurality of touch electrodes TE included in 110.

Accordingly, the stylus adjacent to the display panel 110 can receive the uplink signal through the stylus tip. For example, the stylus can receive the uplink signal through one or more of the plurality of touch electrodes TE included in the display panel 110.

In addition, the stylus outputs a downlink signal indicating the position, tilt (slope), or various additional information of the stylus in response to the uplink signal transmitted from the touch display device 100.

The downlink signal output from the stylus can be applied to the touch electrode TE of the display panel 110.

The touch driving circuit TIC of the touch display device 100 receives the downlink signal output from the stylus through the touch electrode TE, and based on the received downlink signal, and obtains the position, the tilt, or various additional information of the stylus.

As an example, the uplink signal can include, for example, a beacon signal or a ping signal.

The beacon signal is a control signal for the touch display device 100 to control driving of the stylus or inform the stylus of necessary information, and can include various types of information necessary for driving the stylus.

For example, the beacon signal can include one or more of the basic information of the display panel 110 (e.g., status information, identification information, type information such as in-cell type, etc.), driving mode information of the display panel 110 (e.g., mode identification information such as active mode and idle mode), downlink signal characteristic information (e.g., frequency, number of pulses, etc.), driving timing related information, multiplexer driving information, power mode information (e.g., LHB information in which the display panel and the stylus is not driven in order to reduce power consumption, etc.). The beacon signal can further include information for synchronization between the display panel 110 and the stylus.

The ping signal Ping can be a control signal for synchronization of the downlink signal.

The additional information that can be included in the downlink signal can include, for example, one or more of pressure, stylus ID, button information, battery information, and error check information.

Figure 12:
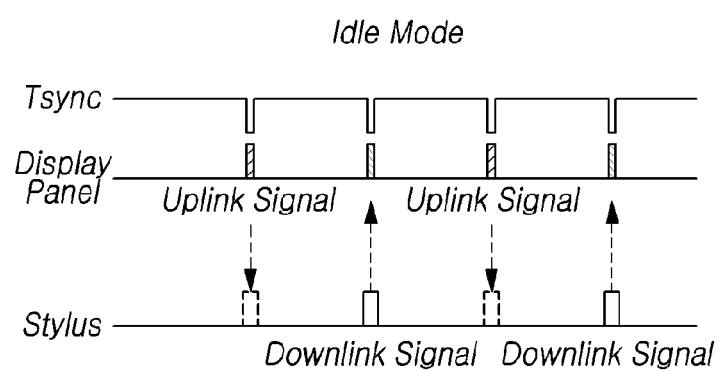
FIG. 12 illustrates a timing at which touch driving is performed on a stylus in the case of an idle mode in a touch display device according to embodiments of the present disclosure.

FIG. 12 illustrates a timing at which touch driving is performed on a stylus in the case of an idle mode in a touch display device according to embodiments of the present disclosure.

Referring to FIG. 12, the touch display device 100 according to the embodiments of the present disclosure can be operated in the active mode and the idle mode according to a mode control signal MCS generated by the touch controller TCR.

When the touch sensing operation is performed in the blank period, the timing controller 140 can generate a touch driving signal Tsync which has a touch driving period of time A in the active mode, but that of time B less than the time A in the idle mode during one display frame period.

In the case of the LHB driving operation including the plurality of touch driving periods in one display frame period, the timing controller 140 can generate a touch driving signal Tsync(BS) which has A number of the touch driving periods in the active mode and B number of the touch driving periods smaller than the A number in the idle mode during one display frame period.

Since the display frame periods of the active mode and the idle mode are the same, the touch driving period of the idle mode within one display frame period is reduced compared to that of the active mode, but the display driving period of the idle mode can be increased compared to that of the active mode.

In this case, the uplink signal transmitted from the display panel 110 to the stylus and the downlink signal transmitted from the stylus to the display panel 110 can be transmitted in the idle mode during the touch driving period.

For example, in the first touch driving period after entering the idle mode, the beacon signal, which is one of the uplink signals, can be transmitted from the display panel 110 to the stylus one or more times.

When the beacon signal is transmitted from the display panel 110 to the stylus, the stylus can output the downlink signal in a predetermined touch driving period according to a predetermined protocol in response to the beacon signal.

In this case, the downlink signal output from the stylus can be applied to one or more of the plurality of touch electrodes TE included in the display panel 110 during the second touch driving period.

For example, the stylus can receive the uplink signal from the display panel 110 during the initial touch driving period in the idle mode, and then transmit the downlink signal to the display panel 110 during the second touch driving period.

In this case, when the downlink signal output from the stylus is a downlink signal for the position of the stylus, the downlink signal can be a signal composed of pulses that swing periodically. Alternatively, when the downlink signal output from the stylus is a downlink signal for data of the stylus, the downlink signal can be a signal composed of non-periodic pulses representing the corresponding data.

As described above, the touch display device 100 alternately transmits the uplink signal transmitted from the display panel 110 to the stylus and the downlink signal transmitted from the stylus to the display panel 110 during the touch driving period after entering the idle mode, thereby reducing power consumption and at the same time efficiently performing synchronization with the stylus.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention.

The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention

What is claimed is:

1. A touch display device, comprising:
    a display panel including a plurality of touch electrodes;
    a touch driving circuit operating in a first mode and a second mode according to a touch sensing type, and configured to detect a touch presence or a touch position based on a touch sensing signal received from the plurality of touch electrodes; and
    a timing controller configured to:
        generate a first type of touch synchronization signal having a first level for displaying a first image during a first display period of a first display frame and a second level for detecting the touch position during a touch driving period of the first display frame, and supply the first type of touch synchronization signal to the touch driving circuit to operate the touch driving circuit in the first mode, and
        generate a second type of touch synchronization signal having the first level for displaying a second image during a second display period of a second display frame and the second level for detecting the touch presence during a touch driving period of the second display frame, and supply the second type of touch synchronization signal to the touch driving circuit to operate the touch driving circuit in the second mode,
    wherein the touch driving period of the second display frame for the second mode is shorter than the touch driving period of the first display frame for the first mode, and the second display period of the second display frame for the second mode is longer than the first display period of the first display frame for the first mode.

2. The touch display device according to claim 1, wherein the first mode is a mode for detecting the touch position, and the second mode is a mode for detecting the touch presence.

3. The touch display device according to claim 2, wherein in the second mode, a same touch driving signal is simultaneously supplied to all of the plurality of touch electrodes in the display panel.

4. The touch display device according to claim 1, wherein in the second mode, at least some of touch sensing functions performed in the first mode are limited.

5. The touch display device according to claim 1, wherein the timing controller, in the second mode, turns off at least a part of power control signals transmitted to the touch driving circuit in the first mode.

6. The touch display device according to claim 1, wherein the touch driving period of the first display frame in the first mode is divided into a plurality touch driving periods that are separated from each other by a plurality of display periods, and
    wherein the second display frame in the second mode includes only one touch driving period and only one display period.

7. The touch display device according to claim 6, wherein a time period of each of the plurality touch driving periods in the first mode is equal to a time period of each of the plurality of display periods in the first mode.

8. The touch display device according to claim 1, wherein a pulse of the first type of touch synchronization signal during the first display frame in the first mode is shorter than a pulse of the second type of touch synchronization signal during the second display frame in the second mode.

9. The touch display device according to claim 1, further comprising:
    a touch controller connected between the timing controller and the touch driving circuit,
    wherein the timing controller is further configured to:
        receive a mode control signal from the touch controller, and
        generate the first type of touch synchronization signal or the second type of touch synchronization signal based on the mode control signal received from the touch controller,
    wherein a pulse of the mode control signal is longer than a pulse of the first type of touch synchronization signal and a pulse of the second type of touch synchronization signal.

10. A touch driving circuit comprising:
    a touch sensing circuit configured to supply a touch driving signal to a display panel including a plurality of touch electrodes, and receive a touch sensing signal received from the plurality of touch electrodes; and
    a touch controller configured to generate a mode control signal according to the touch sensing signal, receive a first type of touch synchronization signal based on a first mode and a second type of touch synchronization signal based on a second mode according to the mode control signal, and detect a touch position according to the first type of touch synchronization signal and detect a touch presence according to the second type of touch synchronization signal,
    wherein a touch driving period in the second mode based on the second type of touch synchronization signal is shorter than a touch driving period in the first mode based on the first type of touch synchronization signal, and wherein in the second mode, a touch driving signal is simultaneously supplied to all of the plurality of touch electrodes in the display panel.

11. A touch driving method comprising:

receiving a touch sensing signal from a plurality of touch electrodes disposed on a display panel;

generating a mode control signal according to the touch sensing signal;

generating a first type of touch synchronization signal based on a first mode and a second type of touch synchronization signal based on a second mode according to the mode control signal, wherein a touch driving period in the second mode based on the second type of touch synchronization signal is shorter than a touch driving period in the first mode based on the second type of touch synchronization signal;

supplying a touch driving signal to the display panel during a touch driving period determined by the first type of touch synchronization signal or the second type of touch synchronization signal; and in response to receiving the second type of touch synchronization signal in the second mode, blocking one or more power control signals among data control signals to a low level transmitted to a touch driving circuit.

* * * * *